United States Patent
Stille et al.

(10) Patent No.: US 12,207,164 B2
(45) Date of Patent: Jan. 21, 2025

(54) METHODS, WIRELESS COMMUNICATION DEVICE, IMS AND OCS FOR SENDING INFORMATION TO COMMUNICATION NETWORK SUBSCRIBERS

(71) Applicant: Telefonaktiebolaget LM Ericsson (publ), Stockholm (SE)

(72) Inventors: Mats Stille, Bromma (SE); Andreas Anulf, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 206 days.

(21) Appl. No.: 17/913,000

(22) PCT Filed: Mar. 31, 2020

(86) PCT No.: PCT/SE2020/050333
§ 371 (c)(1),
(2) Date: Sep. 20, 2022

(87) PCT Pub. No.: WO2021/201733
PCT Pub. Date: Oct. 7, 2021

(65) Prior Publication Data
US 2023/0141444 A1    May 11, 2023

(51) Int. Cl.
*H04W 4/24* (2024.01)
*H04M 15/00* (2024.01)

(52) U.S. Cl.
CPC .......... *H04W 4/24* (2013.01); *H04M 15/57* (2013.01); *H04M 15/64* (2013.01); *H04M 15/846* (2013.01)

(58) Field of Classification Search
CPC ....... H04W 4/24; H04M 15/57; H04M 15/64; H04M 15/846; H04L 12/14; H04L 65/1069; H04L 65/1104; H04L 65/1016
See application file for complete search history.

(56) References Cited

U.S. PATENT DOCUMENTS

2008/0123603 A1* 5/2008 Cai .................. H04M 7/129
                                                          455/406
2012/0099715 A1* 4/2012 Ravishankar ......... H04M 15/88
                                                          379/114.01

(Continued)

OTHER PUBLICATIONS

Sánchez-Esguevillas, Antonio, et al. "IMS: The new generation of internet-protocol-based multimedia services." Proceedings of the IEEE 101.8 (2013): 1860-1881. (Year: 2013).*

(Continued)

*Primary Examiner* — Sharad Rampuria
(74) *Attorney, Agent, or Firm* — COATS & BENNETT, PLLC

(57) ABSTRACT

Disclosed is a method performed by an IP Multimedia System, IMS (140), of a communication network. The method comprises receiving information of a call initiation or a call reception by a wireless communication device (110), the information comprising an ID indicative of a subscriber of the wireless communication device (110). The method further comprises sending information of the initiated or received call to an online charging system, OCS (150), the information comprising the ID indicative of the subscriber of the wireless communication device (110), receiving, from the OCS (150) and in response to the sending, a pointer referring to a notification picture, and sending the pointer to the wireless communication device (110). Hereby it is possible for an operator to send notification pictures to its subscribers. Disclosed are also methods performed by the OCS (150) and the wireless communication device (110).

21 Claims, 6 Drawing Sheets

(56) References Cited

U.S. PATENT DOCUMENTS

2012/0250585 A1* 10/2012 Seetharaman ...... H04L 65/1104
  370/259
2013/0315230 A1   11/2013 Li et al.
2014/0169224 A1*  6/2014 Zuo .................... H04L 65/1016
  370/259
2021/0385895 A1* 12/2021 Buckley ............. H04L 65/1045

OTHER PUBLICATIONS

Karagiannis, Georgios, et al. "Mobile cloud networking: Virtualisation of cellular networks." 2014 21st international conference on telecommunications (ICT). IEEE, 2014. (Year: 2014).*

* cited by examiner

METHODS, WIRELESS COMMUNICATION DEVICE, IMS AND OCS FOR SENDING INFORMATION TO COMMUNICATION NETWORK SUBSCRIBERS

TECHNICAL FIELD

The present disclosure relates generally to methods, IP Multimedia Subsystems (IMS), Online Charging Systems (OCS) and wireless communication devices for sending of information to subscribers of communication networks. The present disclosure further relates to computer programs and carriers corresponding to the above methods, devices and nodes.

BACKGROUND

In a wireless communication network there is today few possibilities for operators or communication service providers to push relevant information from their charging systems to their subscribers' wireless communication devices.

Especially, it could be of interest for an operator or service provider to be able to send images to the subscribers with information such as information of balance on the account of the subscriber, offers from the operator or service provider, information on the called party etc.

SUMMARY

It is an object of the invention to address at least some of the problems and issues outlined above. It is possible to achieve these objects and others by using methods, IMS, OCS and wireless communication device as defined in the attached independent claims.

According to one aspect, a method is provided, which is performed by an IMS of a communication network. The method comprises receiving information of a call initiation or a call reception by a wireless communication device, the information comprising an ID indicative of a subscriber of the wireless communication device, and sending information on the initiated or received call to an OCS, the information comprising the ID indicative of the subscriber of the wireless communication device. The method further comprises receiving, from the OCS and in response to the sending, a pointer referring to a notification picture, and sending the pointer to the wireless communication device.

According to another aspect, a method is provided, which is performed by an OCS of a communication network. The method comprises receiving, from an IMS, information of a call initiated or received by a wireless communication device, the information comprising an ID indicative of a subscriber of the wireless communication device. The method further comprises checking, based on the ID indicative of the subscriber, whether the subscriber of the wireless communication device is subject to a notification picture, and when the subscriber of the wireless communication device is subject to a notification picture, sending, to the IMS, a pointer referring to the notification picture, the pointer being intended for the wireless communication device.

According to another aspect, a method is provided, which is performed by a wireless communication device for a call initiated or received by the wireless communication device. The method comprises receiving, from an IMS, a pointer referring to a notification picture, the pointer originating from an OCS, downloading the notification picture using the received pointer, and displaying the downloaded notification picture.

According to yet another aspect, an IMS is provided, which is operable in a communication system. The IMS comprises a processing circuitry and a memory. Said memory contains instructions executable by said processing circuitry, whereby the IMS is operative for receiving information of a call initiation or a call reception by a wireless communication device, the information comprising an ID indicative of a subscriber of the wireless communication device. The IMS is further operative for sending information of the initiated or received call to an OCS, the information comprising the ID indicative of the subscriber of the wireless communication device, receiving, from the OCS and in response to the sending, a pointer referring to a notification picture, and sending the pointer to the wireless communication device.

According to yet another aspect, an OCS is provided, which is operable in a communication system. The OCS comprises a processing circuitry and a memory. Said memory contains instructions executable by said processing circuitry, whereby the OCS is operative for receiving, from an IMS, information of a call initiated or received by a wireless communication device, the information comprising an ID indicative of a subscriber of the wireless communication device. Further, the OCS is operative for checking, based on the ID indicative of the subscriber, whether the subscriber of the wireless communication device is subject to a notification picture, and when the subscriber of the wireless communication device is subject to a notification picture, sending, to the IMS, a pointer referring to the notification picture, the pointer being intended for the wireless communication device.

According to still another aspect, a wireless communication device is provided, which is operable in a wireless communication system. The wireless communication device comprises a processing circuitry and a memory. Said memory contains instructions executable by said processing circuitry, whereby the wireless communication device is operative for receiving, from an IMS, a pointer referring to a notification picture, the pointer originating from an OCS, downloading the notification picture using the received pointer, and displaying the downloaded notification picture.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
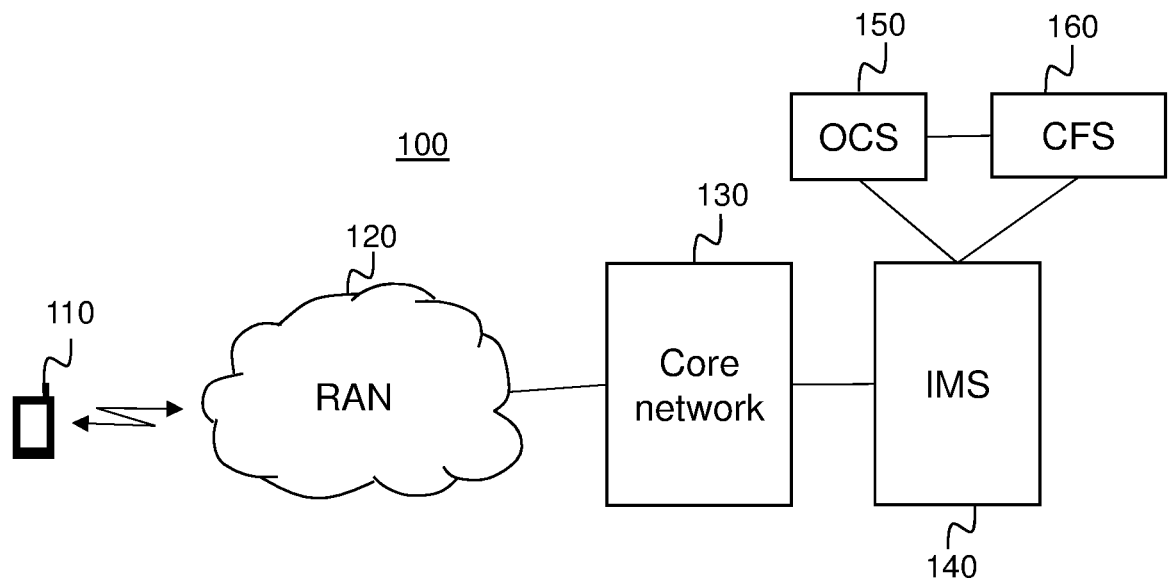
FIG. 1 is a schematic block diagram illustrating a communication network in which the present invention may be used.

FIG. 1 shows a wireless communication network 100 in which the present invention may be used. The wireless communication network 100 comprises a radio access network (RAN) 120 comprising RAN nodes that are adapted for wireless communication with a wireless communication device 110. The wireless communication network 100 further comprises a core network 130 connected to the RAN 120 and an IP Multimedia Subsystem (IMS) 140 connected to the core network 130. The IMS is an architectural framework for delivering IP multimedia services. IMS uses IETF protocols wherever possible, e.g. the Session Initiation Protocol (SIP), To the IMS 140 there is connected an Online Charging System (OCS) 150. The OCS 150 is a system allowing an operator or service provider to charge their customers, in real time, based on service usage. Further, to the IMS 140 there is a content file store (CFS) 160, i.e. a storage space connected, in which the IMS 140 and also the OCS 150 can store files.

The wireless communication device 110 may be any type of device capable of wirelessly communicating with RAN nodes using radio signals. For example, the wireless communication device 110 may be a User Equipment (UE), a machine type wireless communication device or a wireless communication device capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE), a computer etc.

The wireless communication network 100 may be any kind of wireless communication network that can provide radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

Figure 2:
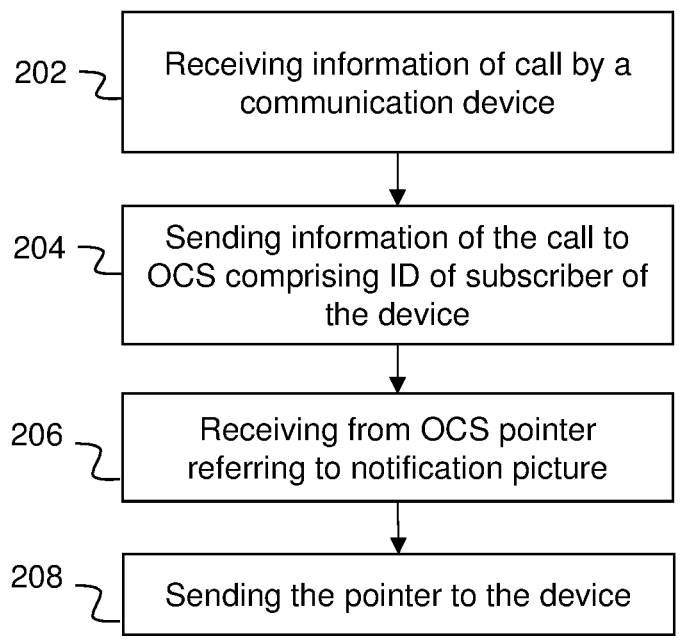
FIG. 2 is a flowchart illustrating a method performed by an IMS, according to possible embodiments.

FIG. 2, in conjunction with FIG. 1, describes a method performed by an IMS 140, of a communication network. The method comprises receiving 202 information of a call initiation or a call reception by a wireless communication device 110, the information comprising an ID indicative of a subscriber of the wireless communication device 110, and sending 204 information on the initiated or received call to an OCS 150, the information comprising the ID indicative of the subscriber of the wireless communication device 110. The method further comprises receiving 206, from the OCS 150 and in response to the sending 204, a pointer referring to a notification picture, and sending 208 the pointer to the wireless communication device 110.

The wireless communication device can then use this pointer to download the picture to which the pointer refers. Hereby it becomes possible for operators or service providers to push relevant information from the charging system directly to the subscriber in a picture format, which is not possible today. Such information could be subscriber account balance information, offers from the subscriber's operator, advertisements from third parties provided through the operator, and, for a calling party, an image of the called company when the called company has a free-of-charge number to e.g. a support center. The method could be performed, and the picture could be shown at the subscriber's wireless communication device, at call setup, during a call or at release of call.

The call may be a voice call or a video call. Alternatively, the call may be any other type of media call such as text. The ID indicative of the subscriber of the wireless communication device may be an International Mobile Public User ID (IMPU). Alternatively, the ID indicative of a subscriber of the wireless communication device may be an International Mobile Subscriber Identity (IMSI) or any other known similar user ID. The notification picture, aka notification image, may be a charging-related notification picture, i.e. a picture referring to for example information of remaining data communication amount in GB, or remaining amount of money left on a prepaid account, in case the subscriber has a prepaid account. Alternatively, the notification picture may be any kind of advertisements from the operator or any of its partners. The notification picture may be more than one picture. For example, the picture may be many consecutive picture, i.e. a short video. The picture may be in any format, such as JPEG or PNG if one picture, GIF if a short animation and MPEG4 if a short video clip etc. The pointer may be a web link. That the pointer refers to the notification picture means that the pointer identifies where the notification picture can be found so that the wireless communication device can download the notification picture by using the pointer, e.g. the user clicking on the pointer on the display. The pointer may be obtained by the IMS 140 from the OCS 150 or from the CFS 160. The notification picture was stored by the OCS 150 in the CFS 160 or in any other storage space used.

According to an embodiment, the pointer is sent 208 to the wireless communication device 110 in a Session Initiation Protocol, SIP, 180/183 response message in case the wireless communication device is the call initiating part, a SIP 3xx, 4xx or 6xx response message in case the wireless communication device is the call initiating part and the response is a negative response, or in a SIP INVITE message in case the wireless communication device is the call receiving party. Hereby an already existing message is used, thereby saving communication resources compared to setting up and using a new, extra message. The SIP 183 message is a session progress message informing the call initiating party that the IMS is working on the call request from the call initiating party but has not yet started ringing on the called party. The 180 message is informing that the IMS has started ringing on the called party. The pointer may be sent in a call-info SIP header of the SIP 180/183 message, the SIP 3xx, 4xx or 6xx message or in the SIP INVITE message.

Figure 3:
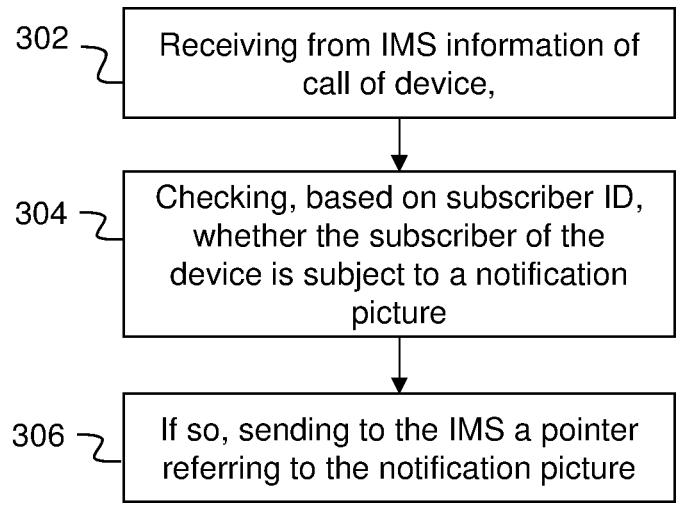
FIG. 3 is another flowchart illustrating a method performed by an OCS, according to possible embodiments.

According to an embodiment, the pointer is received 206 from the OCS 150 as a parameter in a Credit Control Answer message. Hereby an already existing message is used, thereby saving communication resources compared to setting up and using a new, extra message. The parameter may be an Attribute Value Pair, AVP, FIG. 3, in conjunction with FIG. 1, describes a method performed by an OCS 150 of a communication network. The method comprises receiving 302, from an IMS 140, information of a call initiated or received by a wireless communication device 110, the information comprising an ID indicative of a subscriber of the wireless communication device 110. The method further comprises checking 304, based on the ID indicative of the subscriber, whether the subscriber of the wireless communication device 110 is subject to a notification picture, and when the subscriber of the wireless communication device 110 is subject to a notification picture, sending 306, to the IMS 140, a pointer referring to the notification picture, the pointer being intended for the wireless communication device 110. Hereby it becomes possible for operators or service providers to push relevant information from the charging system to the subscriber in a picture format, which is not possible today.

According to an embodiment, the pointer is sent 306 to the IMS 140 as a parameter in a Credit Control Answer message.

According to another embodiment, prior to the initiation of the call, the notification picture is stored in a content file store 160 found from the pointer. The notification picture may have been stored by the OCS. Alternatively the picture may have been stored by any other part of the communication network, such as by an Operation & Management system, O&M system.

According to an embodiment, a plurality of notification pictures may be stored prior to the initiation of the call, each such notification picture having a unique pointer pointing to where the picture can be found. The OCS may then select which of the plurality of notification pictures to send to the user's communication device depending on the situation of the subscriber. For example, there may be a number of different more or less standardized pictures that the OCS may choose from depending on the situation for the subscriber, such as amount of data, e.g. Gigabyte, left on the account for the ongoing month.

Figure 4:
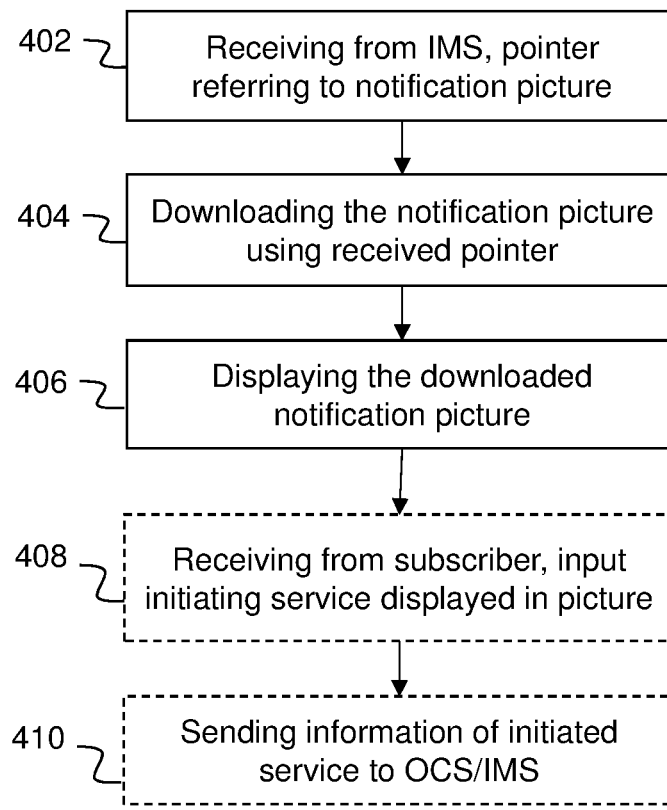
FIG. 4 is another flowchart illustrating a method performed by a wireless communication device, according to possible embodiments.

FIG. 4, in conjunction with FIG. 1, describes a method performed by a wireless communication device 110 of a communication network for a call initiated or received by the wireless communication device 110. The method comprises receiving 402, from an IMS 140 of the communication network, a pointer referring to a notification picture, the pointer originating from an OCS 150 of the communication network, downloading 404 the notification picture using the received pointer, and displaying 406 the downloaded notification picture. Hereby, the wireless communication device 110 can download a notification picture, using a pointer that originates from the OCS. The downloading 404 may comprise resolving the received pointer into a data address, sending the data address to the CFS 160 and receiving the notification picture from the CFS. For example, the received pointer may comprise a Uniform Resource Locator (URL) which is converted into an IP-address. Further, the data address may be sent in a Hypertext Transfer Protocol get (HTTP-get) to the CFS 160. Also, the notification picture may be received in a HTTP 200 message from the CFS.

According to an embodiment, the pointer is received 402 in a SIP 180 or 183 message, or in a SIP 3xx, 4xx or 6xx message in case the wireless communication device 110 has initiated the call, or in a SIP INVITE message in case the wireless communication device is the call receiving party.

According to another embodiment, the displayed 406 notification picture comprises an interactive charging-related service. Further, the method comprises receiving 408, from the subscriber, an input initiating the charging-related service displayed 406 in the notification picture, and sending 410 information of the initiated charging-related service to a node of the communication network. Hereby, a service displayed in the notification picture can be easily initiated by the subscriber, for example by the subscriber clicking on the interactive service on the display, which click the wireless device detects as the input for initiating the service. This facilitates for the subscriber to invoke new services, and as a consequence probably results in more revenue for the operator or service provider. The node of the communication network to which the information of the initiated charging-related service is sent 410 may be the IMS or the OCS but also a back-end billing system of the operator.

Figure 5:
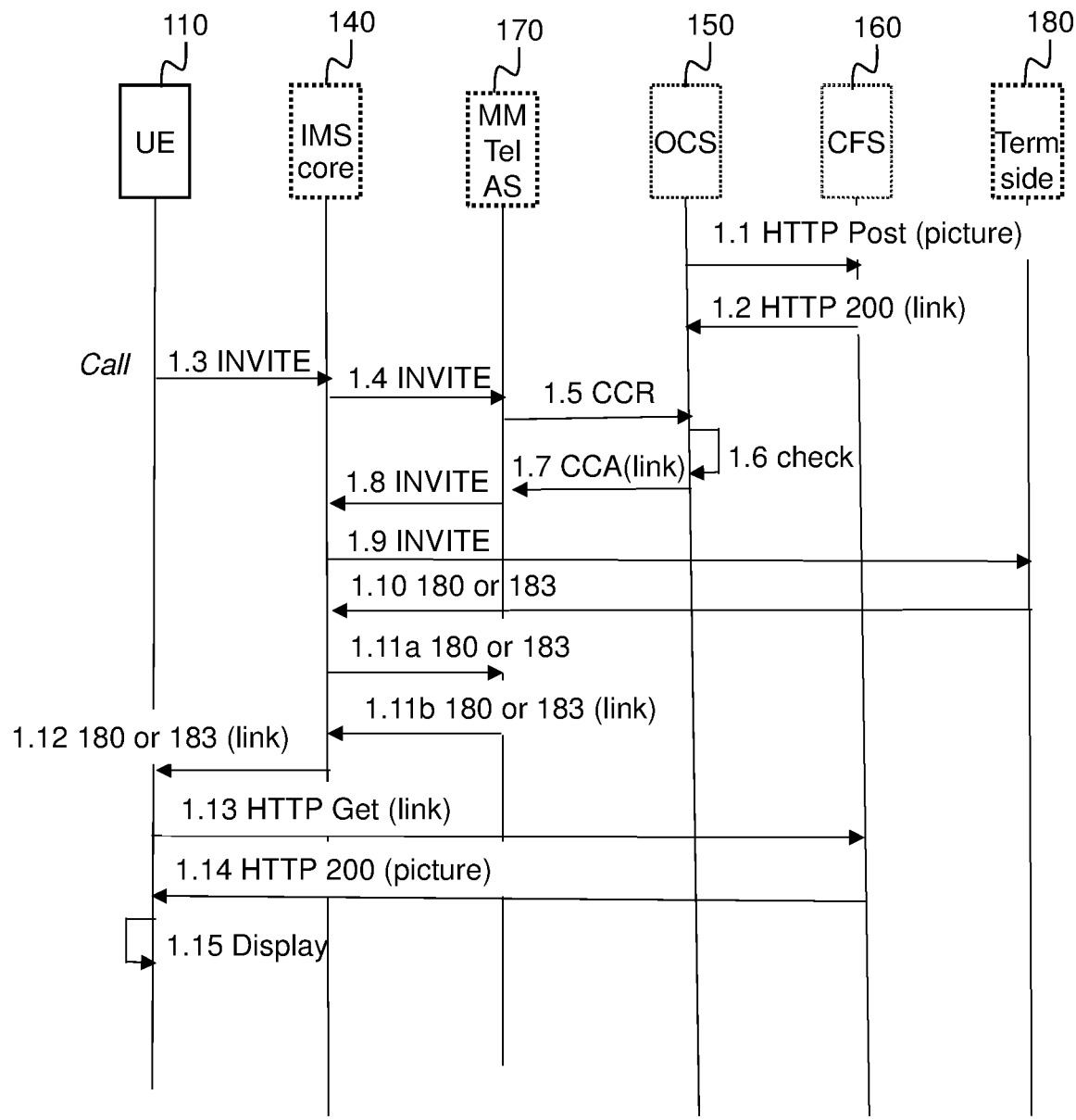
FIGS. 5-6 are signaling diagrams illustrating embodiments of a method according to further possible embodiments.
Figure 6:
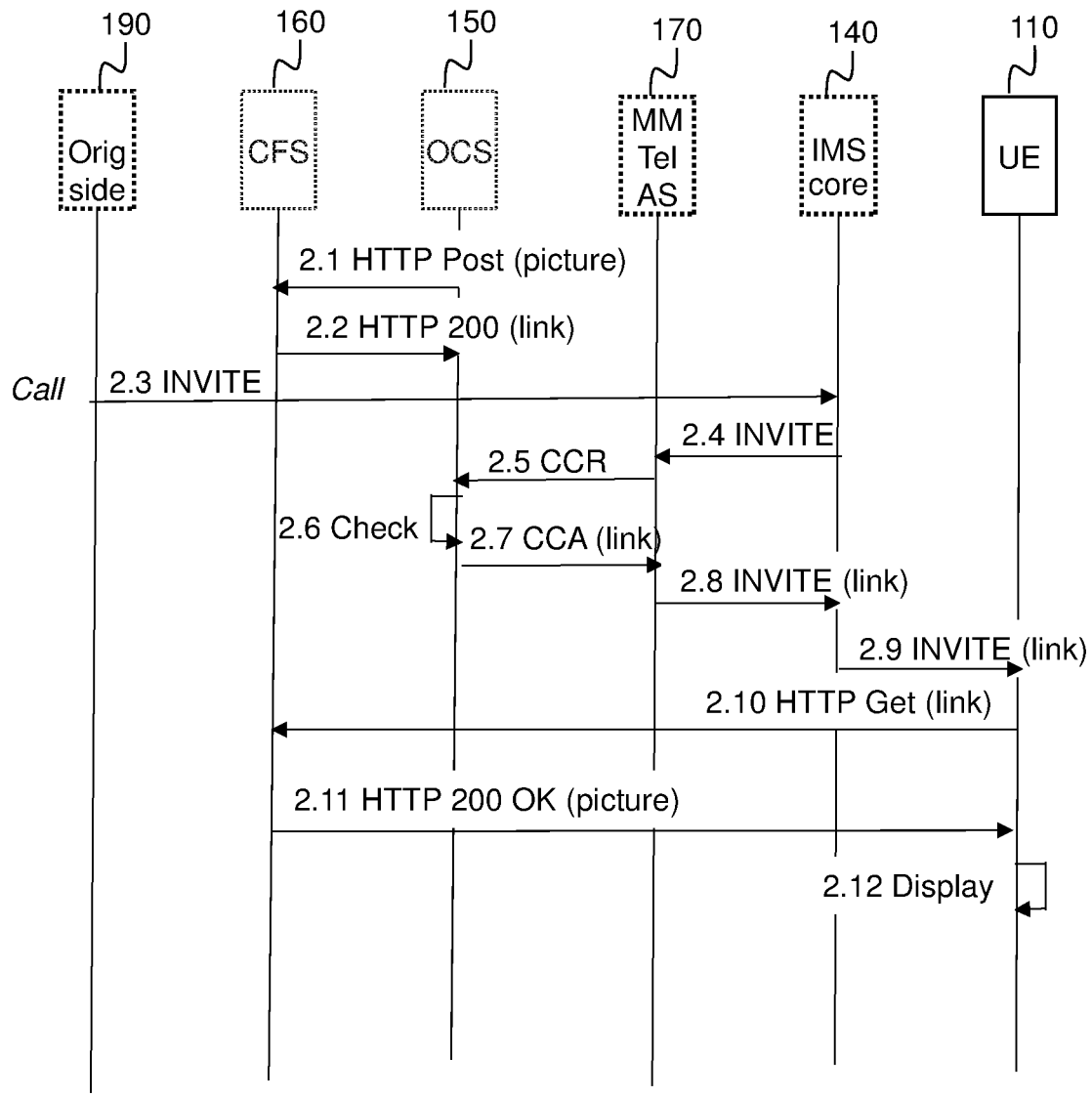

In the following, an embodiment of the invention is shown in FIG. 5. Here the embodiment of the invention is implemented for a Voice over LTE (VoLTE) call made by a calling party, i.e. from a wireless communication device, here exemplified by a UE, of a subscriber that is making a call. The IMS comprises an IMS Core part and an IMS SIP Application Server part. In FIG. 5 and FIG. 6 the IMS has been divided into the IMS core 140 and a Multimedia Telephony Application Server (MMTeIAS) 170, which is a part of the IMS SIP Application Server part. When making a VoLTE call, the UE 110 sends 1.3 a SIP INVITE to the IMS Core 140, the SIP INVITE comprising the called phone number etc. The IMS core 140 then sends 1.4 the SIP INVITE further to the MMTeIAS 170 that checks whether the subscriber of the UE 110 is allowed to make a call. If so, the MMTeIAs 170 sends 1.5 a Credit Control Request (CCR) message to the OCS 150. The CCR is here an account start message. The CCR is either sent as a Diameter signal, or for a Service Based Architecture (SBA) based IMS as an HTTP/2 signal. The OCS 150 then checks 1.6 if the subscriber of the UE 110 is subject to a charging notification picture. The notification picture may be a single picture or video about e.g. that 2.5 GB data bucket remains on the subscriber's account. If the subscriber of the UE is subject to a charging notification picture, e.g. if there is about the 2.5 GB data bucket remaining, the OCS 150 sends 1.7 a Credit Control Answer (CCA) to the MMTeIAS including a web-URL (link) pointing towards the notification picture. In the meantime, when the MMTeIAS 170 has checked that the subscriber is allowed to make a call, it informs 1.8 the IMS core 140 of the allowance in an INVITE, and the IMS core 140 sends 1.9 an INVITE to the called party (Term side) 180 inviting the Term side to answer the call. The Term side 180 responds by a SIP 180 or 183 message 1.10 if answering or a 3xx, 4xx or 5xx if not answering. The IMS core 140 then sends the SIP 180/183 1.11a further to the MMTeIAS 170 that responds 1.11b with a SIP 180/183 in which it includes the web-URL.

Eventually, the IMS core 140 sends 1.12 the web link to the calling UE 110 in a SIP 180/183 message e.g. in a Call-Info SIP header. When the UE 110 receives this message, it resolves the URL of the link to an IP address and sends 1.13 a HHTP Get including the IP address to the CFS 160. The CFS 160 responds by sending 1.14 a HTTP 200 message to the UE 110 including the notification picture, which it obtains using the IP address. When the UE 110 receives the notification picture, it displays 1.15 it on its user interface, i.e. display, to the subscriber. The call can then proceed by e.g. the Term side 180 answering the call, or rejecting the call. Prior to the procedure 1.3-1.15, the OCS 150 has prepared the CFS 160 with the notification picture. This may be accomplished by the OCS 150 sending 1.1 an HTTP Post including the image to the CFS 160. The CFS 160 then responds by sending 1.2 an HTTP 200 including the web-URL (link) to the OCS. Then, when the OCS receives the CCR at 1.5, the OCS checks 1.6 whether the subscriber is subject to the notification picture, and if so it has the link already thanks to steps 1.1 and 1.2.

In FIG. 6 an example is shown in which the embodiment of the invention is implemented for a terminating VoLTE call, i.e. where the Called party has this service. The called party is a wireless communication device, here exemplified by a UE 110, of a subscriber that is receiving a call. When the Calling party, e.g. calling UE, in FIG. 6 called Orig Side 190, makes a VoLTE call, the Orig Side 190 sends 2.3 a SIP INVITE to the IMS core 140 of the UE 110. The IMS core 140 then sends 2.4 the SIP INVITE further to the MMTeIAS 170 that checks whether the subscriber of the UE 110 is allowed to make a call. If so, the MMTeIAs 170 sends 2.5 a Credit Control Request (CCR) message to the OCS 150. The CCR is here an account start message. The CCR is either sent as a Diameter signal, or for an SBA-based IMS as an HTTP/2 signal. The OCS 150 then checks 2.6 if the subscriber of the UE 110 is subject to a charging notification picture. The notification picture may be a single picture or video about e.g. that 2.5 GB data bucket remains on the subscriber's account. If the subscriber of the UE 110 is subject to a charging notification picture, e.g. if there is about the 2.5 GB data bucket remaining, the OCS 150 sends 2.7 a Credit Control Answer (CCA) to the MMTeIAS including a web-URL (link) pointing towards the notification picture, and the MMTeIAS sends 2.8 the web-URL further to the IMS core 140 in an INVITE message.

Then, the IMS core 140 sends 2.9 the web-URL to the called UE 110 in e.g. a Call-Info SIP header in the INVITE message. When the UE 110 receives this response message, it resolves the URL of the link to an IP address and sends 2.10 a HHTP Get including the IP address (link) to the CFS 160. The CFS 160 responds by sending 2.11 a HTTP 200 message to the called UE 110 including the notification picture, which it obtains using the IP address. When the called UE 110 receives the notification picture, it displays 2.12 it on its user interface, i.e. display, to the subscriber. The call can then proceed by e.g. the called UE 110 answering the call, or rejecting the call. Prior to the procedure 2.3-2.12, the OCS 150 has prepared the CFS 160 with the notification picture. This may be accomplished by the OCS 150 sending 2.1 an HTTP Post including the picture to the CFS 160. The CFS 160 then responds by sending 1.2 an HTTP 200 including the web-URL (link) to the OCS. Then, when the OCS receives the CCR at 2.5, the OCS checks 2.6 whether the subscriber is subject to the notification picture, and if so it has the link already thanks to steps 2.1 and 2.2.

Figure 7:
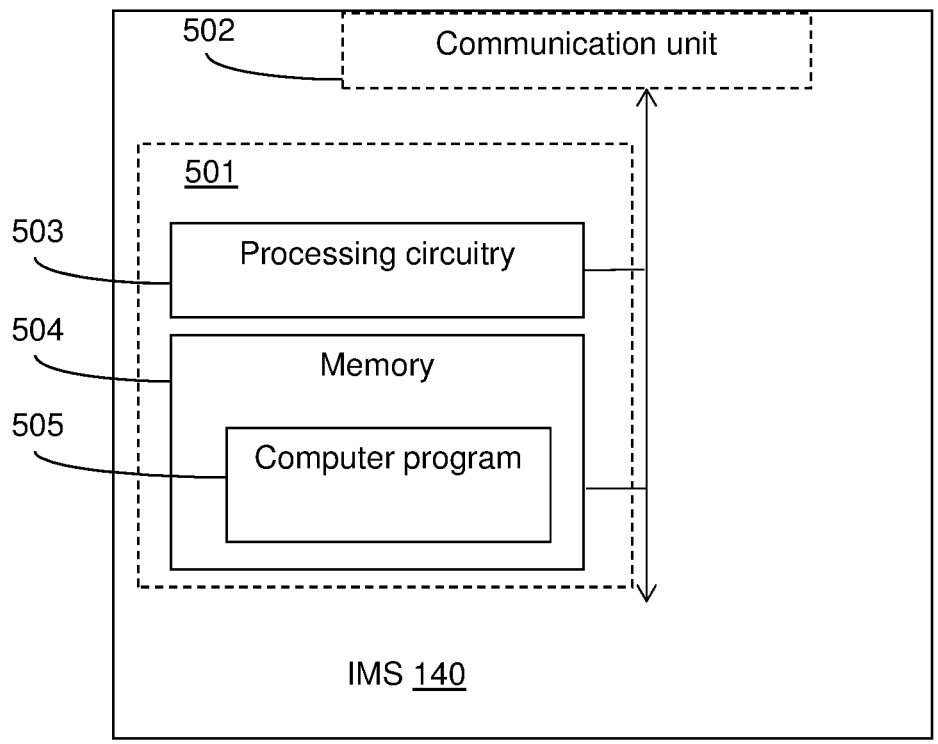
FIGS. 7-9 are block diagrams illustrating an IMS, an OCS and a wireless communication device, respectively and in more detail, according to further possible embodiments.

FIG. 7, in conjunction with FIG. 1, describes an IMS 140 operable in a communication network. The IMS 140 comprising a processing circuitry 503 and a memory 504. Said memory contains instructions executable by said processing circuitry, whereby the IMS 140 is operative for receiving information of a call initiation or a call reception by a wireless communication device 110, the information comprising an ID indicative of a subscriber of the wireless communication device 110. The IMS 140 is further operative for sending information of the initiated or received call to an OCS 150, the information comprising the ID indicative of the subscriber of the wireless communication device 110, receiving, from the OCS 150 and in response to the sending, a pointer referring to a notification picture, and sending the pointer to the wireless communication device 110.

The IMS 140 may be realized e.g. as a single node or as a group of network nodes, wherein IMS-functionality is spread out over different physical, or virtual, nodes. The latter may be called a "cloud-solution".

According to an embodiment, the IMS is operative for sending the pointer to the wireless communication device 110 in a SIP 180 or 183 response message in case the wireless communication device is the call initiating part, a SIP 3xx, 4xx or 6xx response message in case the wireless communication device is the call initiating part and the response is a negative response, or in a SIP INVITE message in case the wireless communication device is the call receiving part.

According to another embodiment, the IMS is operative for receiving the pointer from the OCS 150 as parameter in a Credit Control Answer message.

According to other embodiments, the IMS 140 may further comprise a communication unit 502, which may be considered to comprise conventional means for communication with other nodes of the wireless communication network 100, such as the OCS 150 and the core network 130. The instructions executable by said processing circuitry 503 may be arranged as a computer program 505 stored e.g. in said memory 504. The processing circuitry 503 and the memory 504 may be arranged in a sub-arrangement 501. The sub-arrangement 501 may be a micro-processor and adequate software and storage therefore, a Programmable Logic Device, PLD, or other electronic component(s)/processing circuit(s) configured to perform the methods mentioned above. The processing circuitry 503 may comprise one or more programmable processor, application-specific integrated circuits, field programmable gate arrays or combinations of these adapted to execute instructions.

The computer program 505 may be arranged such that when its instructions are run in the processing circuitry, they cause the IMS 140 to perform the steps described in any of the described embodiments of the IMS 140 and its method. The computer program 505 may be carried by a computer program product connectable to the processing circuitry 503. The computer program product may be the memory 504, or at least arranged in the memory. The memory 504 may be realized as for example a RAM (Random-access memory), ROM (Read-Only Memory) or an EEPROM (Electrical Erasable Programmable ROM). Further, the computer program 505 may be carried by a separate computer-readable medium, such as a CD, DVD or flash memory, from which the program could be downloaded into the memory 504. Alternatively, the computer program may be stored on a server or any other entity to which the IMS 140 has access via the communication unit 502. The computer program 505 may then be downloaded from the server into the memory 504.

Figure 8:
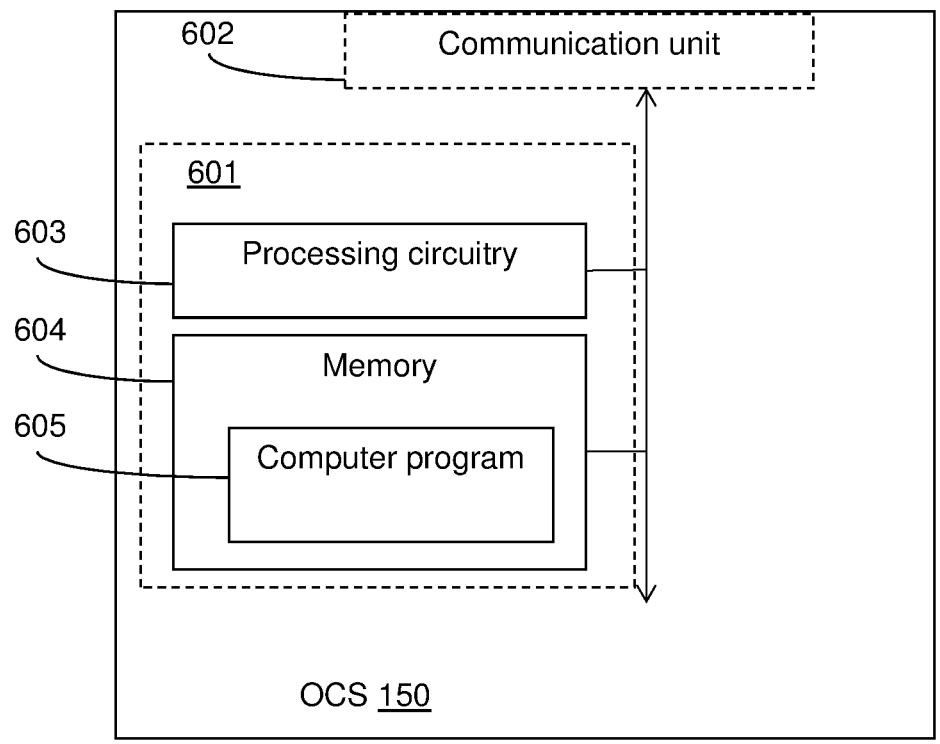

FIG. 8, in conjunction with FIG. 1, shows an OCS 150 operable in a communication network. The OCS 150 comprises a processing circuitry 603 and a memory 604. Said memory contains instructions executable by said processing circuitry, whereby the OCS 150 is operative for receiving, from an IMS 140, information of a call initiated or received by a wireless communication device 110, the information comprising an ID indicative of a subscriber of the wireless communication device 110. Further, the OCS 150 is operative for checking, based on the ID indicative of the subscriber, whether the subscriber of the wireless communication device 110 is subject to a notification picture, and when the subscriber of the wireless communication device 110 is subject to a notification picture, sending, to the IMS 140, a pointer referring to the notification picture, the pointer being intended for the wireless communication device 110.

The OCS 150 may be realized e.g. as a single node or as a group of network nodes, wherein OCS-functionality is spread out over different physical, or virtual, nodes. The latter may be called a "cloud-solution".

According to an embodiment, the OCS 150 is operative for sending the pointer to the IMS 140 as a parameter in a Credit Control Answer message.

According to another embodiment, prior to the initiation of the call, the OCS is operative for storing the notification picture in a content file store 160 found from the pointer.

According to other embodiments, the OCS 150 may further comprise a communication unit 602, which may be considered to comprise conventional means for communication with other nodes of the wireless communication network 100, such as the IMS 140 and the CFS 160. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the OCS 150 to perform the steps described in any of the described embodiments of the OCS 150 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the OCS 150 has access via the communication unit 602. The computer program 605 may then be downloaded from the server into the memory 604.

Figure 9:
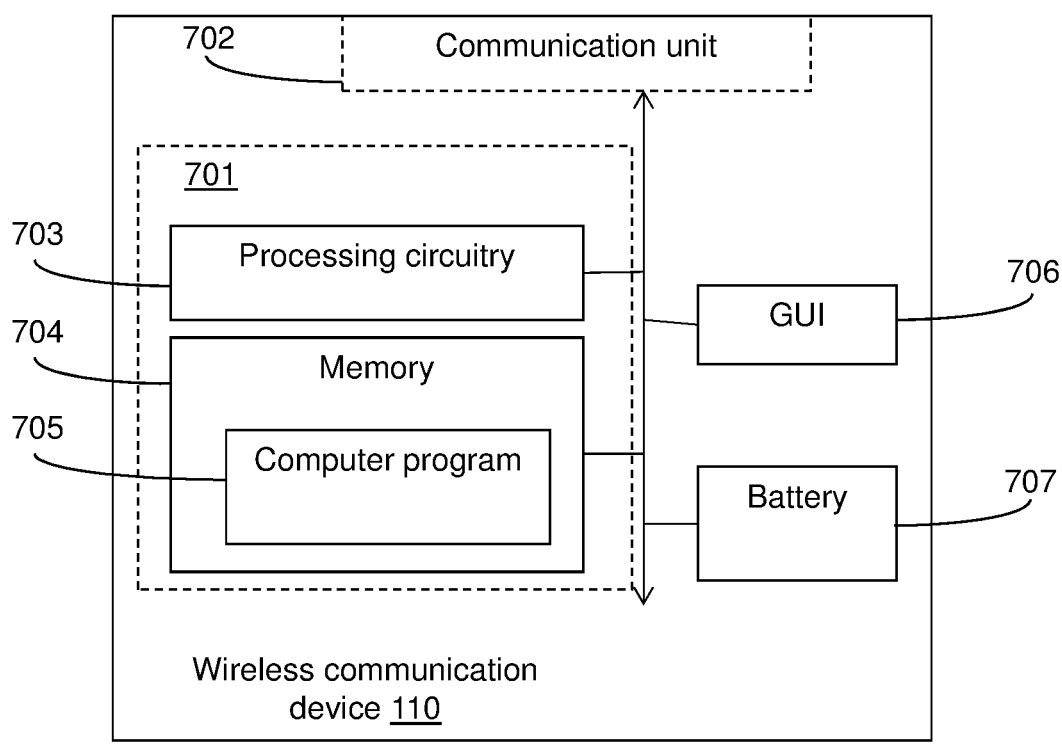

FIG. 9, in conjunction with FIG. 1, describes a wireless communication device 110, which is operable in a wireless communication network. The wireless communication device 110 comprises a processing circuitry 703 and a memory 704. Said memory contains instructions executable by said processing circuitry, whereby the wireless communication device 110 is operative for receiving, from an IMS 140 of the communication network, a pointer referring to a notification picture, the pointer originating from an OCS 150, downloading the notification picture using the received pointer, and displaying the downloaded notification picture.

According to an embodiment, the wireless communication device 110 is operative for receiving the pointer in a SIP 180 or 183 message or in a SIP 3xx, 4xx or 6xx message when the wireless communication device is a call-initiating part, or operative for receiving the pointer in a SIP INVITE message in case the wireless communication device is a call receiving part.

According to another embodiment, the displayed notification picture comprises an interactive charging-related service. Further, the wireless communication device 110 is operative for receiving, from the subscriber, an input initiating the charging-related service displayed in the notification picture, and sending information of the initiated charging-related service to a node of the communication network.

According to other embodiments, the wireless communication device 110 may further comprise a wireless communication unit 702, which may be considered to comprise conventional means for wireless communication with nodes of the RAN 120, such as a wireless transceiver. The wireless communication device 110 may further comprise a Graphical User Interface (GUI) 706, which may comprise a display with which the user may be interactive, and possible also a separate keyboard. The picture is displayed on the display of the GUI 706, and the user may react on the picture by e.g. clicking on the display when it is interactive in order to invoke a service. The wireless communication device 110 may also comprise a battery 707 for power support. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the wireless communication device 110 to perform the steps described in any of the described embodiments of the wireless communication device 110 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the wireless communication device 110 has access via its communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by an IP Multimedia System (IMS) of a communication network, the method comprising:
receiving information of a call initiation or a call reception by a wireless communication device, the information comprising an ID indicative of a subscriber of the wireless communication device;
sending information of the initiated or received call to an online charging system (OCS) the information comprising the ID indicative of the subscriber of the wireless communication device;
receiving, from the OCS and in response to the sending, a pointer referring to a notification picture, and
sending the pointer to the wireless communication device.

2. The method of claim 1, wherein the pointer is sent to the wireless communication device in a Session Initiation Protocol (SIP) 180 or 183 response message in case the wireless communication device is the call initiating part, a SIP 3xx, 4xx or 6xx response message in case the wireless communication device is the call initiating part and the response is a negative response, or in a SIP INVITE message in case the wireless communication device is the call receiving part.

3. The method of claim 1, wherein the pointer is received from the OCS as a parameter in a Credit Control Answer message.

4. A method performed by an Online Charging System (OCS) of a communication network, the method comprising:
receiving, from an IP Multimedia System (IMS) information of a call initiated or received by a wireless communication device, the information comprising an ID indicative of a subscriber of the wireless communication device;
checking, based on the ID indicative of the subscriber, whether the subscriber of the wireless communication device is subject to a notification picture, and
when the subscriber of the wireless communication device is subject to a notification picture, sending, to the IMS, a pointer referring to the notification picture, the pointer being intended for the wireless communication device.

5. The method of claim 4, wherein the pointer is sent to the IMS as a parameter in a Credit Control Answer message.

6. The method of claim 4, wherein prior to the initiation of the call, the OCS stores the notification picture in a content file store found from the pointer.

7. A method performed by a wireless communication device of a communication network for a call initiated or received by the wireless communication device, the method comprising:
receiving, from an IMS of the communication network, a pointer referring to a notification picture, the pointer originating from an OCS of the communication network,
downloading the notification picture using the received pointer, and
displaying the downloaded notification picture.

8. The method of claim 7, wherein the pointer is received in a Session Initiation Protocol (SIP) 180 or 183 message, or in a SIP 3xx, 4xx or 6xx message in case the wireless communication device has initiated the call, or in a SIP INVITE message in case the wireless communication device is the call receiving party.

9. The method of claim 7, wherein the displayed notification picture comprises an interactive charging-related service, the method further comprising:
receiving, from the subscriber, an input initiating the charging-related service displayed in the notification picture, and
sending information of the initiated charging-related service to a node of the communication network.

10. An IP Multimedia System (IMS) operable in a communication network, the IMS comprising a processing circuitry and a memory, said memory containing instructions executable by said processing circuitry, whereby the IMS is configured to:
receive information of a call initiation or a call reception by a wireless communication device, the information comprising an ID indicative of a subscriber of the wireless communication device;
send information of the initiated or received call to an online charging system (OCS) the information comprising the ID indicative of the subscriber of the wireless communication device;
receive, from the OCS and in response to the sending, a pointer referring to a notification picture, and
send the pointer to the wireless communication device.

11. The IMS of claim 10, further configured to send the pointer to the wireless communication device in a SIP 180 or 183 response message in case the wireless communication device is the call initiating part, a SIP 3xx, 4xx or 6xx response message in case the wireless communication device is the call initiating part and the response is a negative response, or in a SIP INVITE message in case the wireless communication device is the call receiving part.

12. The IMS of claim 10, further configured to receive the pointer from the OCS as parameter in a Credit Control Answer message.

13. An Online Charging System (OCS) operable in a communication network, the OCS comprising a processing circuitry and a memory, said memory containing instructions executable by said processing circuitry, whereby the OCS is configured to:
receive, from an IP Multimedia System (IMS) information of a call initiated or received by a wireless communication device, the information comprising an ID indicative of a subscriber of the wireless communication device;
check, based on the ID indicative of the subscriber, whether the subscriber of the wireless communication device is subject to a notification picture, and
when the subscriber of the wireless communication device is subject to a notification picture, send, to the IMS, a pointer referring to the notification picture, the pointer being intended for the wireless communication device.

14. The OCS of claim 13, further configured to send the pointer to the IMS as a parameter in a Credit Control Answer message.

15. The OCS of claim 13, wherein prior to the initiation of the call, the OCS is further configured to store the notification picture in a content file store found from the pointer.

16. A wireless communication device, operable in a wireless communication network, the wireless communication device comprising a processing circuitry and a memory, said memory containing instructions executable by said processing circuitry, whereby the wireless communication device is configured to:
receive, from an IMS of the communication network, a pointer referring to a notification picture, the pointer originating from an OCS of the communication network, download the notification picture using the received pointer, and display the downloaded notification picture.

17. The wireless communication device of claim 16, further configured to receive the pointer in a SIP 180 or 183 message or in a SIP 3xx, 4xx or 6xx message when the wireless communication device is a call-initiating part, or further configured to receive the pointer in a SIP INVITE message in case the wireless communication device is a call receiving part.

18. The wireless communication device of claim 16, wherein the displayed notification picture comprises an interactive charging-related service, and the wireless communication device is further configured to:

receive, from the subscriber, an input initiating the charging-related service displayed in the notification picture, and send information of the initiated charging-related service to a node of the communication network.

19. A non-transitory computer readable storage medium storing a computer program comprising instructions, which, when executed by at least one processing circuitry of an IMS of a communication network, causes the IMS to perform the steps of:

receiving information of a call initiation or a call reception by a wireless communication device, the information comprising an ID indicative of a subscriber of the wireless communication device;

sending information of the initiated or received call to an online charging system (OCS) the information comprising the ID indicative of the subscriber of the wireless communication device;

receiving, from the OCS and in response to the sending, a pointer referring to a notification picture, and sending the pointer to the wireless communication device.

20. A non-transitory computer readable storage medium storing a computer program comprising instructions, which, when executed by at least one processing circuitry of an OCS of a communication network, causes the OCS to perform the steps of:

receiving, from an IP Multimedia System (IMS) information of a call initiated or received by a wireless communication device, the information comprising an ID indicative of a subscriber of the wireless communication device;

checking, based on the ID indicative of the subscriber, whether the subscriber of the wireless communication device is subject to a notification picture, and when the subscriber of the wireless communication device is subject to a notification picture, sending, to the IMS, a pointer referring to the notification picture, the pointer being intended for the wireless communication device.

21. A non-transitory computer readable storage medium storing a computer program comprising instructions, which, when executed by at least one processing circuitry of a wireless communication device of a wireless communication network, causes the wireless communication device to perform the steps of:

receiving, from an IMS of the communication network, a pointer referring to a notification picture, the pointer originating from an OCS of the communication network, downloading the notification picture using the received pointer, and displaying the downloaded notification picture.

\* \* \* \* \*